(12) United States Patent
Yamaguchi

(10) Patent No.: US 10,801,685 B2
(45) Date of Patent: Oct. 13, 2020

(54) LIGHT SOURCE APPARATUS AND LIGHT SOURCE APPARATUS DRIVING METHOD

(71) Applicant: STANLEY ELECTRIC CO., LTD., Tokyo (JP)

(72) Inventor: Yuta Yamaguchi, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/447,991

(22) Filed: Jun. 21, 2019

(65) Prior Publication Data

US 2019/0390831 A1 Dec. 26, 2019

(30) Foreign Application Priority Data

Jun. 21, 2018 (JP) ................. 2018-117843

(51) Int. Cl.
| | |
|---|---|
| *F21S 41/176* | (2018.01) |
| *F21V 14/04* | (2006.01) |
| *F21V 9/30* | (2018.01) |
| *F21S 41/16* | (2018.01) |
| *F21S 41/25* | (2018.01) |
| *F21S 41/675* | (2018.01) |
| *F21Y 115/30* | (2016.01) |

(52) U.S. Cl.
CPC ............ *F21S 41/176* (2018.01); *F21S 41/16* (2018.01); *F21S 41/25* (2018.01); *F21S 41/675* (2018.01); *F21V 9/30* (2018.02); *F21V 14/04* (2013.01); *F21Y 2115/30* (2016.08)

(58) Field of Classification Search
CPC ........ F21S 41/176; F21S 41/16; F21S 41/645; F21V 9/30
See application file for complete search history.

(56) References Cited

U.S. PATENT DOCUMENTS 9,515,239 B2* 12/2016 Inada ................. H01L 33/505
9,618,697 B2* 4/2017 Inada ................. G02B 6/1225
(Continued)

FOREIGN PATENT DOCUMENTS

| JP | 2005-148459 A | 6/2005 |
| JP | 2014-165450 A | 9/2014 |

(Continued)

*Primary Examiner* — William N Harris
(74) *Attorney, Agent, or Firm* — Xsensus LLP

(57) ABSTRACT

Provided is a light source apparatus detecting, even when a minute crack occurs in a fluorescent material plate, such a defect to take a safety measure. The light source apparatus includes a laser light source emitting laser light, a fluorescent material plate including a laser light irradiation region and being capable of emitting light by irradiating the laser light irradiation region with laser light to convert the light in wavelength, a light scanning mechanism capable of scanning the laser light irradiation region with the laser light, and a transparent conductive film pattern disposed on the fluorescent material plate in the laser light irradiation region and including a parallel wiring portion in a first direction. The interval between adjacent portions of the transparent conductive film pattern in a second direction intersecting the first direction changes along the second direction depending on a portion which is located within the pattern.

19 Claims, 6 Drawing Sheets

(56) References Cited

U.S. PATENT DOCUMENTS

| | | | |
|---|---|---|---|
| 10,094,522 B2* | 10/2018 | Hirasawa | ............... F21K 9/64 |
| 10,511,139 B2* | 12/2019 | Schrama | ............... H01S 5/005 |
| 2014/0009952 A1* | 1/2014 | Nomura | ............... F21S 41/16 |
| | | | 362/509 |
| 2015/0249183 A1* | 9/2015 | Hirasawa | ............... H05B 33/14 |
| | | | 257/98 |
| 2016/0265749 A1* | 9/2016 | Inada | ............... F21V 5/10 |
| 2016/0290856 A1* | 10/2016 | Fiederling | ............... F21S 41/14 |

FOREIGN PATENT DOCUMENTS

| | | |
|---|---|---|
| JP | 2017-056762 A | 3/2017 |
| WO | 2016/156000 A2 | 10/2016 |

\* cited by examiner

Dense     Transparent Conductive    Coarse
             Film Pattern

FIG. 5A
Conventional Art
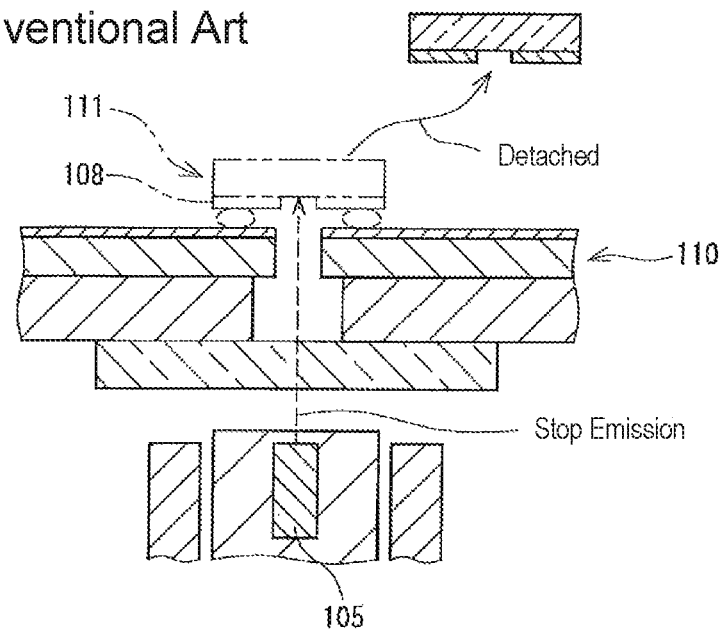
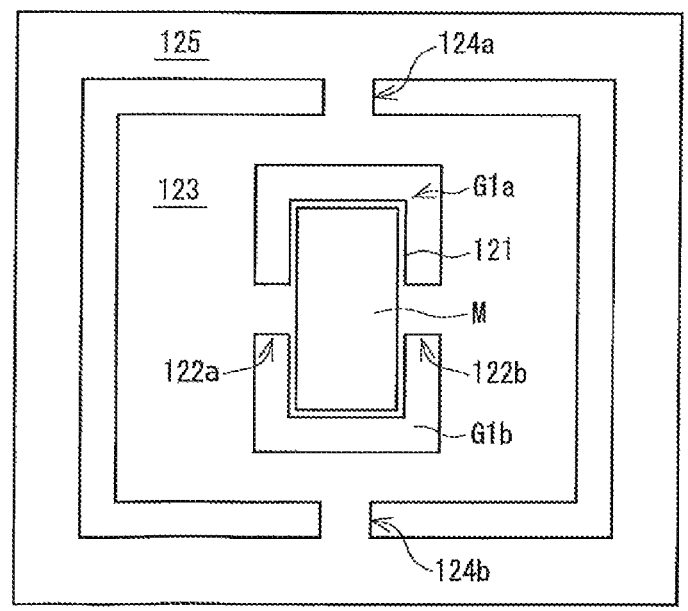
FIG. 5B
Conventional Art

LIGHT SOURCE APPARATUS AND LIGHT SOURCE APPARATUS DRIVING METHOD

This application claims the priority benefit under 35 U.S.C. § 119 of Japanese Patent Application No. 2018-117843 filed on Jun. 21, 2018, which is hereby incorporated in its entirety by reference.

TECHNICAL FIELD

The present invention relates to a light source apparatus and a light source apparatus driving method, and more particularly to a light source apparatus and a light source apparatus driving method such as a headlamp for a vehicle having a laser light source, a light scanning mechanism, and a fluorescent material plate.

BACKGROUND ART

A known light source has a fluorescent material plate supported by a supporting member. The fluorescent material plate is irradiated with light emitted from a semiconductor laser to obtain white light. If the fluorescent material plate peels off or the fluorescent material plate is detached from the support member due to vibration or shock, there is a risk that the laser light directly travels to the outside. In a vehicular headlamp or the like, a driver of an oncoming vehicle may be irradiated with laser light in this case. To cope with these problems, there are also safety standards for laser products.

As shown in FIG. 5A, it is proposed that a circuit pattern substrate 110 having a window is disposed above a semiconductor laser 105, a fluorescent material plate 111 having a reflective electrode 108 surrounding an irradiation area with laser light having passed through the window of the circuit pattern substrate 110 is disposed on (above) the circuit pattern substrate 110, and the fluorescent material plate 111 is irradiated with the laser light from the semiconductor laser 105 through the opening of the reflective electrode 108. The driving current of the semiconductor laser 105 is supplied from a driving circuit including the reflective electrode 108 on the fluorescent material plate 111 as a part of wiring. When the fluorescent material plate 111 is detached from the circuit pattern substrate 110 due to some reasons, the wiring of the driving circuit is disconnected, so that the operation of the semiconductor laser 105 is stopped (see, for example, Japanese Patent Application Laid-Open No. 2014-165450).

Another known laser lamp unit has a configuration in which light from a laser element is condensed by a lens, and the laser light incident on and transmitted through a fluorescent material and fluorescence by the fluorescent material are combined together to generate white light.

Further proposed is a laser lamp unit of a type in which laser light is scanned by a mirror or the like to selectively irradiate light in accordance with the position of an oncoming vehicle (see, for example, Japanese Patent Application Laid-Open No. 2017-056762).

As shown in FIG. 5B, for example, there has been a proposal for such a lamp unit in which right and left longitudinal centers of a rectangular central portion 121 are coupled to an intermediate portion 123 by torsion bars 122a and 122b, and the upper and lower lateral centers of the intermediate portion 123 are coupled to an outer portion 125 by torsion bars 124a and 124b. Grooves G1a and G1b are formed between the central portion 121 and the intermediate portion 123, and grooves 124a and 124b are formed between the intermediate portion 123 and the outer portion 125. A mirror mechanism capable of scanning the reflected light in the two-dimensional manner is formed by disposing a mirror plane M in the central portion 121 and further providing a drive mechanism such as a piezoelectric element to the torsion bar portions 122 and 124 (see, for example, Japanese Patent Application Laid-Open No. 2005-148459).

There has been another proposal in which a fluorescent material plate is disposed on a transparent substrate, a folded wiring pattern, a parallel wiring pattern, or the like made of a transparent conductive film is formed on the fluorescent material plate, so that any damage of the fluorescent material plate is transmitted to the wiring pattern of the transparent conductive film, and detected on the basis of a resistance change, a disconnection, or the like of the wiring pattern (see, for example, WO2016/156000).

In a laser headlamp of the type that scans laser light, laser light having a high intensity is scanned over a fluorescent material plate. Since the light emitted from the fluorescent material plate by the irradiation of the laser light travels in all directions, and the laser light traveling in the fluorescent material is also scattered by the fluorescent material, the intensity per unit area of the emitted light becomes low, and thus eye safety is achieved.

When the laser light scans the surface of the fluorescent material plate, a temperature distribution is generated in the fluorescent material plate. The headlamp is exposed to the outside and is also affected by the outside air temperature. For example, a temperature change of −40° C. to +100° C. or higher is expected for the headlamp. A mechanical external force such as strain is generated due to the temperature change. The headlamp also receives external forces such as vibrations, shocks, etc. from the vehicle body. Due to the influence of these external forces and the like, the fluorescent material plate may not only be detached therefrom, but may also be damaged or broken to generate minute cracks, breakage, and the like.

If a defect such as a minute crack occurs in the fluorescent material plate, there is a possibility that the laser light is directly projected to the outside. In a mechanism for detecting an abnormality of the entire fluorescent material plate such as detachment of the fluorescent material plate, a minute crack or the like cannot be detected, and there may still be a possible risk that eye safety of a person in front of the light source apparatus is impaired.

SUMMARY

The present invention was devised in view of these and other problems and features in association with the conventional art. According to an aspect of the present invention, there can be provided a light source apparatus capable of detecting, even when a small defect such as a minute crack occurs in a fluorescent material plate, such a defect to take a safety measure with a simplified configuration.

According to another aspect of the present invention, a light source apparatus can include a laser light source capable of emitting laser light, a fluorescent material plate including a laser light irradiation region and being capable of emitting light that is generated by irradiating the laser light irradiation region with laser light to convert the light in wavelength in response to the laser light irradiation, a light scanning mechanism capable of scanning the laser light irradiation region with the laser light, and a transparent conductive film pattern disposed on the fluorescent material plate in the laser light irradiation region and including a parallel wiring portion in a first direction. In this light source apparatus, the interval between adjacent portions of the transparent conductive film pattern in a second direction intersecting the first direction changes along the second direction (depending on a portion which is located within the pattern).

In the light source apparatus according to the foregoing aspect, the interval between the adjacent portions of the transparent conductive film pattern in the second direction may be narrower in a central portion in the second direction than in both end portions in the second direction.

Further in the light source apparatus according to the foregoing aspect, the parallel wiring portion of the transparent conductive film pattern may extend in the first direction, and the light scanning mechanism may scan the laser light in the first direction.

Further in the light source apparatus according to the foregoing aspect, the first direction may be any of a vertical direction and a horizontal direction, which may be defined when the light source apparatus is assumed to be installed in a vehicle.

Further in the light source apparatus according to the foregoing aspect, the laser light source may emit laser light forming an elliptical spot with a major axis and a minor axis with the minor axis extending in the first direction. The elliptical spot may be formed in the laser light irradiation region.

According to another aspect of the present invention, a vehicular headlamp can include the foregoing light source apparatus, and a projection lens configured to project light emitted from the fluorescent material plate forward.

According to still another aspect of the present invention, a method for driving a light source apparatus can include: scanning a laser light irradiation region of a fluorescent plate with laser light generated from a laser light source to generate light while allowing a part of the laser light to pass through the fluorescent plate. The method can further include: disposing, on the fluorescent plate, parallel wirings extending in parallel with a first direction in the laser light irradiation region and connection wirings connecting the parallel wirings in regions other than the laser light irradiation region to form a continuous wiring, setting an interval between the adjacent parallel wirings to difference values depending on a portion where it is located, and setting a total of widths of the adjacent parallel wirings and a width of a space therebetween to a value smaller than a diameter of laser light to be irradiated there, and scanning the laser light irradiation region with the laser light emitted from the laser light source along the first direction while being shifted in a second direction intersecting the first direction to generate light with a wide region, wherein when a portion of the parallel wirings is damaged, the wiring is caused to be disconnected.

In the method for driving a light source apparatus according to the foregoing aspect, the laser light source may emit the laser light forming an elliptical spot with a major axis and a minor axis in the laser light irradiation region with the minor axis extending in the first direction.

In the method for driving a light source apparatus according to the foregoing aspect, the first direction may be any of a vertical direction and a horizontal direction.

The method for driving a light source apparatus according to the foregoing aspect may further include projecting the laser light having transmitted through the fluorescent material plate and light emitted from the fluorescent material plate through a projection lens forward.

The present invention can provide a transparent conductive film pattern which is cut even by minute cracks.

Furthermore, change of the pitch of the parallel wiring type transparent conductive film pattern can shorten the laser light scanning length.

BRIEF DESCRIPTION OF DRAWINGS

These and other characteristics, features, and advantages of the present invention will become clear from the following description with reference to the accompanying drawings, wherein:

FIG. 5A is a schematic cross-sectional view of a laser light source system according to a conventional art in which the power supply to a laser light source is cut off when the fluorescent material plate is detached by an external force or the like, and FIG. 5B is a plan view schematically illustrating a light scanning mechanism according to a conventional art in which the mechanism is supported by a torsion bar and has a mirror surface capable of two-dimensional scanning.

DESCRIPTION OF EXEMPLARY EMBODIMENTS

A description will now be made below to light source apparatus and driving method thereof of the present invention with reference to the accompanying drawings in accordance with exemplary embodiments.

In the apparatus in the conventional art illustrated in FIG. 5A, when the fluorescent material plate 111 is detached, the power supply wiring is disconnected, so that an abnormality can be detected. However, even if a minute crack occurs in the fluorescent material plate, the abnormality cannot be detected if the fluorescent material plate itself is still bonded to the support substrate.

The present inventor has investigated the formation of wiring of a fine pitch on a fluorescent material plate such that any wiring is disconnected if a minute crack occurs. For example, parallel wirings (first pattern) having a fine pitch are formed in a laser light irradiation region. The sensitivity for detecting the abnormality of the fluorescent material plate is set by the pitch of the parallel wirings.

A wiring (second pattern) for connecting the parallel wirings in the laser light irradiation region is formed outside the laser light irradiation region. Hereinafter, the first pattern and the second pattern may be collectively referred to as a wiring. When parallel wirings are connected in series to form a single wiring, an abnormality can be detected by a single continuous wiring.

At least the wiring of the first pattern is formed from a transparent conductive film of such as indium tin oxide (ITO) or indium zinc oxide (IZO), and the wiring in the laser light irradiation region is made to transmit light, thereby suppressing a decrease in the intensity of the output light.

If the wiring of the second pattern is also formed from the same transparent conductive film as the wiring of the first pattern, the wiring of the first pattern and the wiring of the second pattern can be formed by the same manufacturing process. It is preferable that electrodes having excellent functions such as connectivity are connected to both ends of the single continuous wiring.

Figure 1A:
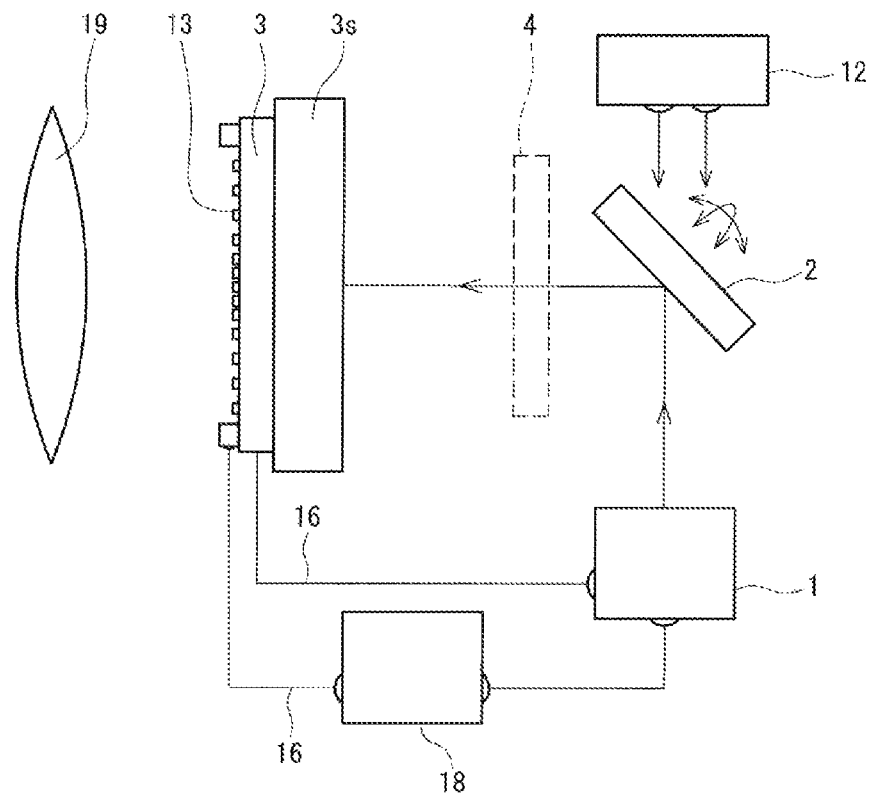
FIGS. 1A and 1B are a cross-sectional view illustrating a main configuration of a vehicular headlamp according to an exemplary embodiment of the present invention, and a plan view illustrating an example of a shape of a transparent conductive film on a fluorescent material plate, respectively.

FIG. 1A is a cross-sectional view schematically illustrating a configuration of a laser-light-scanning type vehicular headlamp according to an exemplary embodiment of the present invention. The laser light source 1 is, for example, a laser using a (GaInAl)N-based semiconductor, and emits blue light beams. The laser light has an elliptical cross-sectional shape. The light scanning mechanism 2 has, for example, a mirror mechanism capable of two-dimensional scanning as illustrated in FIG. 5B, and a control device 12 can control the manner in which the two-dimensional scanning is performed.

The fluorescent material plate 3 is a layer formed of a material that receives high energy light and emits fluorescence (e.g., yellow fluorescence) of which wavelength has been converted, and is disposed on a support substrate 3s, such as quartz or sapphire, that transmits high energy light. On the surface thereof, a transparent conductive film pattern 13 is formed. It is also possible for the fluorescent material plate to emit not only yellow light but also two to three colors of light. The scanning by the light scanning mechanism 2 can cause the laser light to be irradiated to an arbitrary point in the laser light irradiation region of the fluorescent material plate 3. Typically, a two-dimensional scanning is performed along a parallel pattern in a certain direction.

As necessary, a correction optical system 4 capable of adjusting the diameter of the laser light is provided between the light scanning mechanism 2 and the fluorescent material plate 3 to control the diameter of the laser light on the fluorescent material plate 3. In the case where the laser output is constant, the luminance increases when the laser light diameter is reduced, and the luminance decreases when the laser light diameter is increased.

Figure 2A:
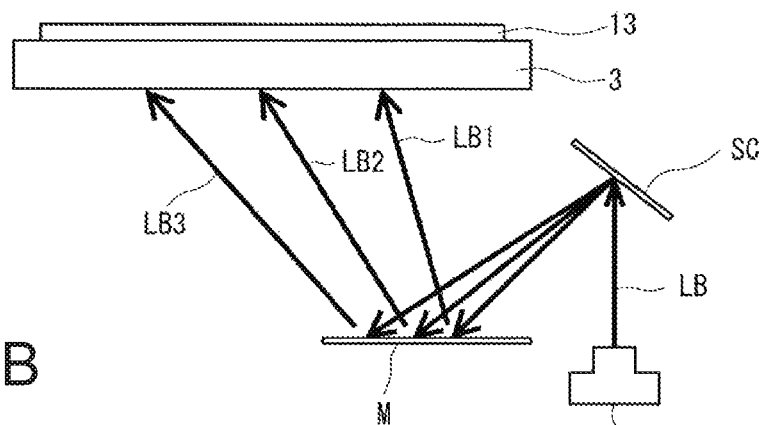
FIG. 2A is a schematic cross-sectional view of a system including a laser light source, a light scanning mechanism, a mirror, and a wavelength conversion member.

FIG. 2A shows a configuration in which the laser light LB emitted from the laser light source LS is first scanned by the reflective light scanning mechanism SC as shown in FIG. 5B, and the laser light LB having been scanned by the light scanning mechanism SC is reflected by the mirror M to scan the surface of the wavelength-converting member 3. In the drawing, the incident angle of the laser light LB traveling from the same point of the light scanning mechanism SC to be incident on the mirror M changes. The smaller the incident angle of the laser light on the left side becomes, the farther the laser light enters the wavelength conversion member 3. That is, in the laser light LB1, LB2, and LB3, the optical path length until the laser light enters the wavelength-converting member 3 increases in the order of LB1, LB2, and LB3.

Figure 2B:
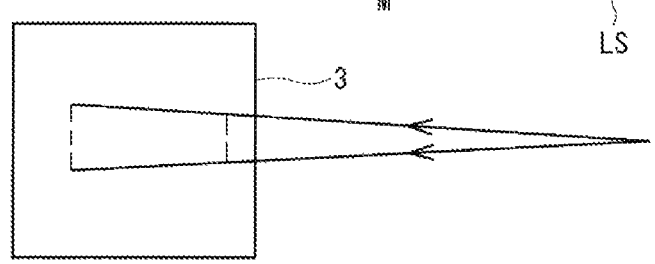
FIG. 2B is a plan view schematically illustrating laser light in FIG. 2A.

FIG. 2B is a plan view schematically illustrating a change in optical path length from the light scanning mechanism SC to the wavelength conversion member 3 on which the light is incident. The laser light diameter gradually increases in size along the optical axis. That is, the size increases with the optical path length. Since the laser light entering the wavelength conversion member 3 at a farther position travels along a long optical path length, the beam diameter is also increased. The laser light diameter can be changed by changing the distance from the light scanning mechanism SC to the wavelength conversion member 3 on which the light is incident. However, the pattern of change is limited.

Figure 2C:
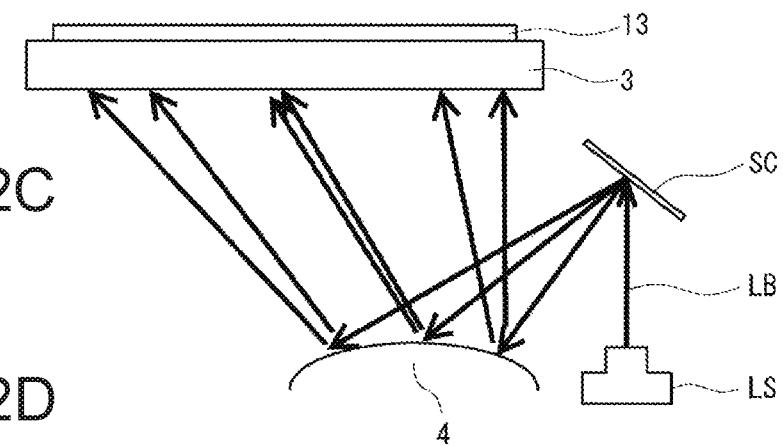
FIG. 2C is a schematic cross-sectional view of a system including a laser light source, a light scanning mechanism, a correcting optical system, and a wavelength conversion member.

In FIG. 2C, the correcting optical system 4 having a convex mirror surface is used instead of the plane mirror M in FIG. 2A. The traveling direction of the laser light LB reflected by the mirror surface of the correction optical system 4 changes in accordance with the direction of the reflection surface of the correction optical system 4. When the plane orientation of the correction optical system 4 (convex shape in the drawing) is set so as to obtain a desired luminance distribution, a desired luminance distribution can be obtained. For example, a convex mirror having a combination of a plurality of plane mirrors may be used in order to realize a plurality of types of line widths.

Figure 2D:
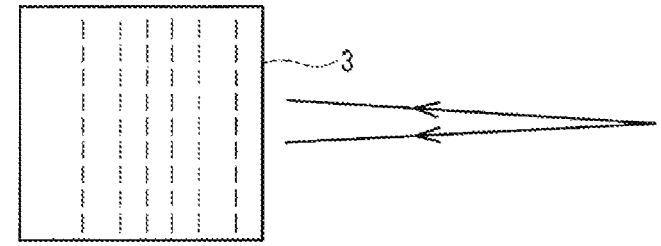
FIG. 2D is a plan view schematically illustrating laser light in FIG. 2C.

FIG. 2D schematically illustrates laser-light scanning patterns when the optical system of FIG. 2C is used. During scanning in the longitudinal (column) direction, the beam diameter is kept constant. Therefore, the width of the scanning beam in the column direction is referred to as the column width. The correction optical system 4 changes the column width as desired. In the drawing, a scanning pattern is illustrated in which the column width is narrow at the center and the column width is widened on both sides.

Figure 1B:
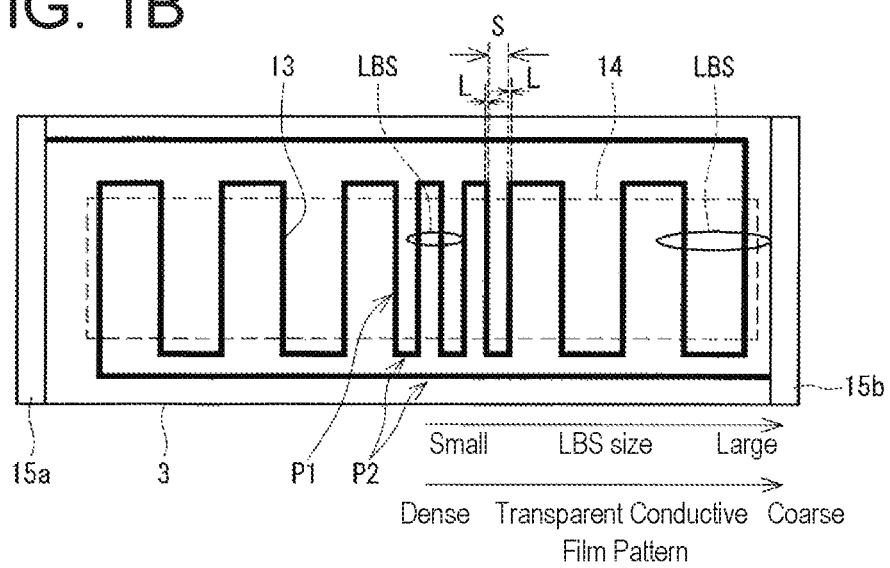

FIG. 1B schematically shows a wiring pattern formed on the surface of the fluorescent material plate 3. The fluorescent material plate 3 has, for example, a thickness of about 30 μm, and an area with a height of 8 mm and a width of about 18 mm. The wiring pattern 13 of the transparent conductive film is a continuous wiring extending in and out of the laser light irradiation region. In the laser light irradiation region 14, the wiring pattern 13 forms parallel wirings P1 having a narrow interval at the center and a wider interval at each end. Outside the laser light irradiation region 14, the parallel wirings P1 are connected by a transparent conductive film pattern P2 to form a continuous wiring, and both ends are connected to electrodes 15a and 15b formed of a multilayer structure of gold/platinum or the like, respectively.

For example, a current is constantly supplied to the wiring pattern 13, and an abnormality in which the wiring is disconnected to block the flow of the current is detected depending on the presence or absence of the current. In the configuration of FIG. 1A, the driving current of the laser light source 1 flows through the wiring 13. Herein, the detection current of the wiring pattern 13 and the drive current of the laser light source 1 may be different from each other.

The size of the crack to be detected needs to be set small in the high luminance region, but can be set large in the low luminance region. The transparent conductive film pattern can be set to be narrow at the center and wide at both ends so as to obtain necessary detection accuracy. For example, a single transparent conductor pattern is disposed along each scanning line of the laser light.

Let L be the wiring (line) width in the parallel wiring portion P1, and S be the wiring interval (space). If a minute crack occurs only in the space S portion, the wiring is not affected and the minute crack cannot be detected. If a minute crack crosses any of the parallel wirings (causing disconnection), the current does not flow, and so the minute crack can be detected. Even if a crack extends to the half (L/2) of the adjacent parallel wirings P1, conductivity remains in the remaining parallel wirings having a width of L/2. If the crack width is equal to (2L+S), any of the wirings is disconnected, and the resistance value becomes infinite. The (2L+S), which contains the space S and the line widths 2L on both sides of the space S, is adopted as an index for detecting minute cracks.

The parallel wiring pattern P1 is divided into several parts and the index (2L+S) is set for each part separately. For example, when the central portion has a high luminance and the two side portions have a relatively low luminance, the index (2L+S) of the central portion is set to a value capable of detecting a minute crack, and the indices of the two side portions are set to a value larger than the index of the central portion.

When the laser light irradiation region of the fluorescent material plate is scanned with the laser light, the pitch of the laser light scanning line is adjusted to the laser light diameter. In order to obtain a high luminance at the central portion, a small laser light diameter and a small scanning line pitch are set at the central portion, while the laser light diameter is increased and the scanning line pitch is also increased in the end portions where a high luminance is not required. Increasing the scanning line pitch at the end portions can shorten the scanning length and also reduce the length of the transparent conductor pattern.

The laser light spot LBS has an elliptical shape elongated in the lateral direction in the drawing. A laser light spot having a high luminance and a small in-plane dimension has, for example, a height of about 0.06 mm and a lateral width of about 0.5 mm, and a laser light spot having a low luminance and a large in-plane dimension has, for example, a height of about 0.25 mm and a lateral width of about 2 mm.

Figure 3A:
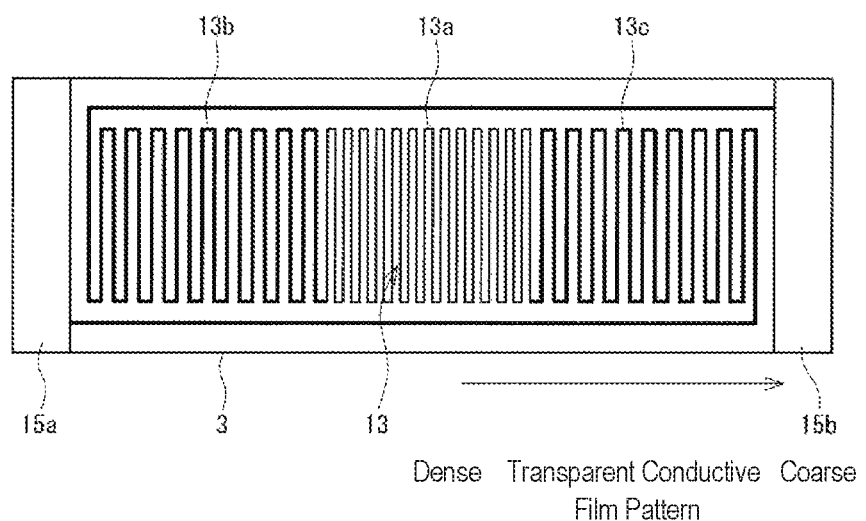
FIGS. 3A and 3B are each a plan view illustrating an example of a transparent conductive film pattern.

FIG. 3A is a plan view illustrating an example of the transparent conductive film pattern 13. A pattern including wirings parallel to the vertical direction is formed on the main portion of the horizontally long fluorescent material plate 3, and electrodes 15a and 15b are connected to left and right ends, respectively. In the parallel wirings of the transparent conductive film pattern 13, the horizontally-central portion 13a includes a dense pattern and (2L+S) is about 0.034 mm. Both horizontally-side portions (end portions) 13b and 13c are coarse (sparse) patterns and (2L+S) is set to about 0.095 mm. Since the transparent conductive film pattern can discriminate the presence or absence of disconnection if on/off can be discriminated, a dense pattern is formed by a wiring having a small line width. A dense transparent conductive film pattern is formed in the central portion in the horizontal direction, and so a fine crack can also be detected. Since the portions on both sides in the horizontal direction are coarse patterns, the wiring length is reduced.

Figure 3B:
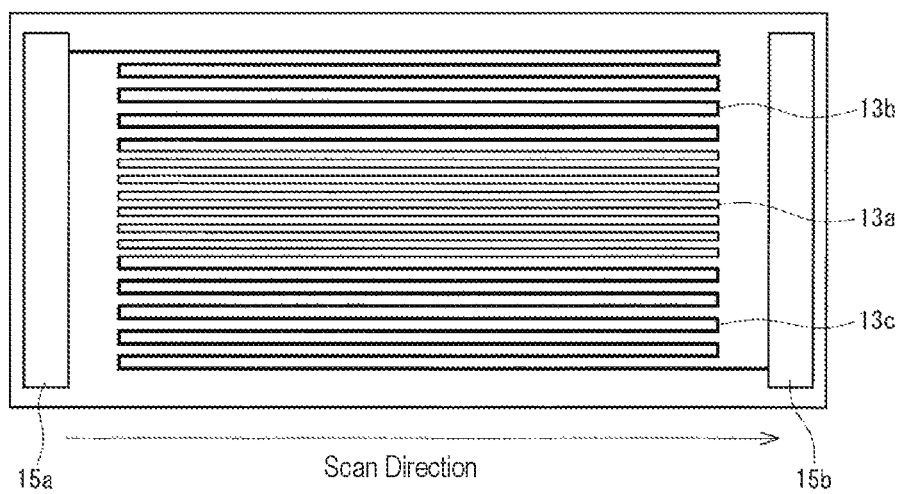

FIG. 3B illustrate an example of horizontally parallel wirings. In the case of a vehicular headlamp illuminating on a road surface with highest luminance, the highest luminance region may extend horizontally and the upper region of the highest luminance region may have reduced luminance. The lower side region of the highest luminance region can also have reduced luminance to some extent. The transparent conductive film pattern 13 in FIG. 3B have horizontally parallel wirings, and the vertical interval of the horizontally parallel wirings is the narrowest in the region corresponding to the highest luminance region, and the wiring interval becomes wider at the upper and lower regions in the vertical direction.

Although the example has been described in which the density of the transparent conductive film pattern is different and dense transparent conductive film pattern is disposed in the central portion and coarse transparent conductive film pattern is disposed in the end portions, the arrangement of a plurality of patterns can be variously modified. Hereinafter, other examples of the transparent conductive film pattern will be described.

Figure 4A:
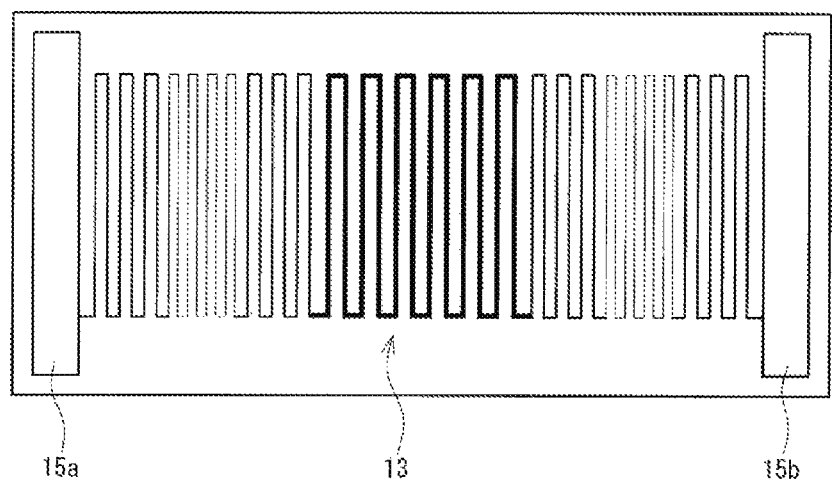
FIGS. 4A to 4D are plan views illustrating exemplary transparent conductive film patterns having a pattern with a large width and pitch in the central portion and a pattern with a reduced width and pitch on both sides, respectively.
Figure 4B:
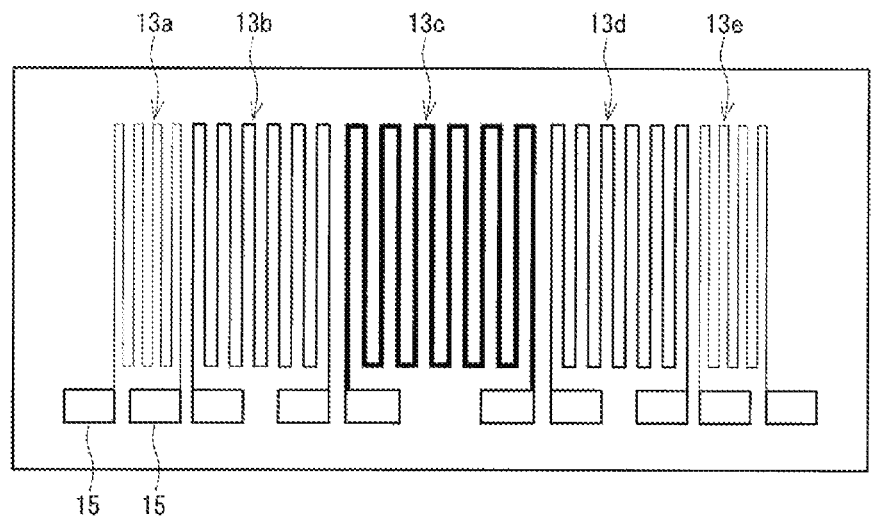
Figure 4C:
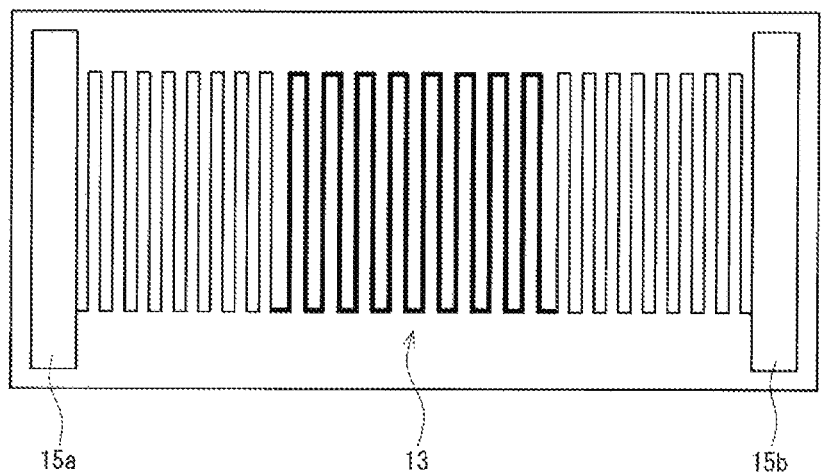
Figure 4D:
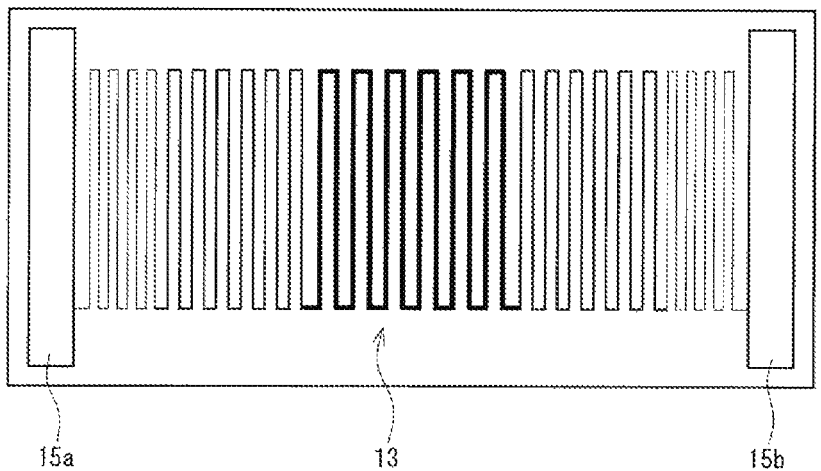

FIGS. 4A to 4D illustrate exemplary arrangements of coarse transparent conductive film patterns in the central portion. FIG. 4A illustrates a transparent conductive film pattern in which patterns having widths and pitches smaller than those of the central portion are arranged on both sides of the central portion. FIG. 4B illustrates a transparent conductive film pattern in which widths and pitches are reduced in three steps from the central portion to both sides. FIG. 4C illustrates a transparent conductive film pattern in which widths and pitches are reduced in two steps from the central portion to both sides, and the widths and the pitches are increased again at the left and right end portions. FIG. 4D illustrates a transparent conductive film pattern formed as five wirings 13a, 13b, 13c, 13d, and 13e in which patterns with decreasing widths and pitches in three steps from the central portion to both ends are separated from each other. An electrode 15 is connected to an end portion of each of the wirings.

The parallel wirings are scanned with an elliptical laser light spot. When moving in the direction intersecting with the parallel wirings, the wiring pitch changes, and the entire surface of the fluorescent material plate may not be uniformly scanned. In order to perform scanning without changing the size of the laser light spot LBS, it is preferable to scan the laser light LB along the extending direction of the parallel wiring.

Examples of the light source apparatus according to the present invention may include general-purpose light sources, and light sources for vehicular headlamps, vehicular lighting units, etc.

It will be apparent to those skilled in the art that various modifications and variations can be made in the present invention without departing from the spirit or scope of the present invention. Thus, it is intended that the present invention cover the modifications and variations of the present invention provided they come within the scope of the appended claims and their equivalents. All related art references described above are hereby incorporated in their entirety by reference.

What is claimed is:

1. A light source apparatus comprising:
   a laser light source capable of emitting laser light;
   a fluorescent material plate including a laser light irradiation region and being capable of emitting light that is generated by irradiating the laser light irradiation region with laser light to convert the light in wavelength in response to the laser light irradiation;
   a light scanning mechanism capable of scanning the laser light irradiation region with the laser light; and
   a transparent conductive film pattern disposed on the fluorescent material plate in the laser light irradiation region and including a parallel wiring portion in a first direction, wherein
   an interval between adjacent portions of the transparent conductive film pattern in a second direction intersecting the first direction has a difference value depending on where the adjacent portions are located within the pattern.

2. The light source apparatus according to claim 1, wherein the interval between the adjacent portions of the transparent conductive film pattern in the second direction is narrower in a central portion in the second direction than in both end portions in the second direction.

3. The light source apparatus according to claim 1, wherein the parallel wiring portion of the transparent conductive film pattern extends in the first direction, and the light scanning mechanism scans the laser light in the first direction.

4. The light source apparatus according to claim 2, wherein the parallel wiring portion of the transparent conductive film pattern extends in the first direction, and the light scanning mechanism scans the laser light in the first direction.

5. The light source apparatus according to claim 1, wherein the first direction is any of a vertical direction and a horizontal direction.

6. The light source apparatus according to claim 3, wherein the laser light source emits laser light forming an elliptical spot with a major axis and a minor axis with the minor axis extending in the first direction.

7. The light source apparatus according to claim 4, wherein the laser light source emits laser light forming an elliptical spot with a major axis and a minor axis with the minor axis extending in the first direction.

8. The light source apparatus according to claim 5, wherein the laser light source emits laser light forming an elliptical spot with a major axis and a minor axis with the minor axis extending in the first direction.

9. A vehicular headlamp comprising:
the light source apparatus according to claim 1; and
a projection lens configured to project light emitted from the fluorescent material plate forward.

10. The vehicular headlamp according to claim 9, wherein the interval between the adjacent portions of the transparent conductive film pattern in the second direction is narrower in a central portion in the second direction than in both end portions in the second direction.

11. The vehicular headlamp according to claim 9, wherein the parallel wiring portion of the transparent conductive film pattern extends in the first direction, and the light scanning mechanism scans the laser light in the first direction.

12. The vehicular headlamp according to claim 9, wherein the first direction is any of a vertical direction and a horizontal direction.

13. The vehicular headlamp according to claim 9, wherein the laser light source emits laser light forming an elliptical spot with a major axis and a minor axis with the minor axis extending in the first direction.

14. A method for driving a light source apparatus comprising:
scanning a laser light irradiation region of a fluorescent plate with laser light generated from a laser light source to generate light while allowing a part of the laser light to pass through the fluorescent plate,
the method further comprising:
disposing, on the fluorescent plate, parallel wirings extending in parallel with a first direction in the laser light irradiation region and connection wirings connecting the parallel wirings in regions other than the laser light irradiation region to form a continuous wiring, setting an interval between the adjacent parallel wirings to difference values depending on where a portion of the adjacent parallel wirings is located, and setting a total of widths of the adjacent parallel wirings and a width of a space therebetween to a value smaller than a diameter of laser light to be irradiated there, and
scanning the laser light irradiation region with the laser light emitted from the laser light source along the first direction while being shifted in a second direction intersecting the first direction to generate light with a wide region, wherein
when a portion of the parallel wirings is damaged, the wiring is caused to be disconnected.

15. The method for driving a light source apparatus according to claim 14, wherein the laser light source emits the laser light forming an elliptical spot with a major axis and a minor axis in the laser light irradiation region with the minor axis extending in the first direction.

16. The method for driving a light source apparatus according to claim 15, wherein the first direction is any of a vertical direction and a horizontal direction.

17. The method for driving a light source apparatus according to claim 14, comprising projecting the laser light having transmitted through the fluorescent material plate and light emitted from the fluorescent material plate through a projection lens forward.

18. The method for driving a light source apparatus according to claim 15, comprising projecting the laser light having transmitted through the fluorescent material plate and light emitted from the fluorescent material plate through a projection lens forward.

19. The method for driving a light source apparatus according to claim 16, comprising projecting the laser light having transmitted through the fluorescent material plate and light emitted from the fluorescent material plate through a projection lens forward.

* * * * *